United States Patent [19]

Kaicher

[11] Patent Number: 4,526,161
[45] Date of Patent: Jul. 2, 1985

[54] SOLAR ROOF ASSEMBLAGE AND INTERNALLY REMOVABLE SOLAR TRANSPARENT ROOF COVER

[76] Inventor: Francis A. Kaicher, P.O. Box 643, Highland Lakes, N.J. 07422

[21] Appl. No.: 597,174

[22] Filed: Apr. 5, 1984

Related U.S. Application Data

[63] Continuation of Ser. No. 246,742, Mar. 23, 1981, abandoned.

[51] Int. Cl.³ ................................................. F24J 3/02
[52] U.S. Cl. .................................... 126/444; 126/429; 126/450
[58] Field of Search ................ 126/428, 429, 444, 450

[56] References Cited

U.S. PATENT DOCUMENTS

4,062,346 12/1977 Rapp, Jr. et al. .................... 126/429
4,098,260 7/1978 Goettl ................................. 126/429
4,111,359 9/1978 Trombe et al. ..................... 126/429
4,150,660 4/1979 Peters et al. ........................ 126/429

*Primary Examiner*—Larry Jones
*Attorney, Agent, or Firm*—Samuelson & Jacob

[57] ABSTRACT

An integrated roof structure for a building is capable of collecting solar energy for use in the building and includes a plurality of parallel rafters, an outer roof cover secured to the tops of the rafters and having solar energy transparent portions between the rafters, and an inner roof cover secured to the bottoms of the rafters and having structurally reinforcing portions spanning the rafters and solar energy absorptive surfaces between the rafters and confronting the solar energy transparent portions to establish solar energy collecting bays bounded by adjacent rafters and the upper and lower roof covers.

13 Claims, 5 Drawing Figures

SOLAR ROOF ASSEMBLAGE AND INTERNALLY REMOVABLE SOLAR TRANSPARENT ROOF COVER

This is a continuation of application Ser. No. 246,742, filed Mar. 23, 1981 now abandoned.

BRIEF DESCRIPTION OF THE INVENTION

At the present time, after years of research and development, solar energy is still apparently available only to the privileged few. The most efficient flat plate collectors are necessarily of large area, and in the northern latitudes, steeply inclined. These facts, almost of necessity, imply the need for some type of roof structure.

Various roofs have been designed within the present state of the art with the idea of capturing the energy of the sun. To date, however, they require a great amount of specialized material and labor. Complicated fabrications (with their potentially leaky joints) which cannot always be accomplished at the job site, construction of more than the two surfaces necessary to define an air passageway, unusally shaped clips and fasteners, portions of the collecting apparatus protruding beyond the building lines, the need for employment of sheet metal workers and riveters, are just a sample of the limitations of the present state of the art. And in the end, present solar collecting roof structures require the sheathing and flashing materials of the conventional building.

An additional problem with large solar collectors has been the difficulty of service and maintenance. When a cover panel fails through vandalism or adverse weather, some individual must ascend the outside surface of the roof to the place of failure. This is normally accomplished by stepping along the longitudinal edges of the collectors, often comprised of slippery steel or aluminum, or, in the alternative, resorting to large expensive relative newness and hence uncertainty of long-range performance of many cover materials, places large solar collectors beyond the desires of many persons.

Accordingly, it is an object of the present invention to provide a novel solar roof assemblege which is a combination roof structure and active solar collector, the salient feature of which is its simplicity. This large active solar collector is not only incorporated into the roof structure, but actually is the roof.

More specifically, it is an object of the invention to utilize both the top and bottom surfaces of the rafters to provide anchorage for the transparent cover and collecting surface, respectively, thus obviating the need for construction of additional surfaces requiring uncommon clips, fastners and pre-fabricated sections.

It is a further object to provide a heat absorbing surface comprised of flat sheets of common building material, easily fastened by ordinary fastners.

It is a further object to provide a roof structure where the components required for the energy collection serve the dual function of contributing to the building's structural integrity, thus negating a need for the sheathing of the conventional roof.

It is yet another object to provide a solar collecting surface which provides a triple function of sealing the building from leaks in the event of a failure of the transparent roof cover.

It is a further object to provide a structure where the rafters serve the dual functions of supporting the structure and directly channeling the heat collecting medium.

It is a further object to provide a new mode of construction which can be accomplished by the ordinary tradesmen generally present at residential construction, not requiring specialized tradesmen such as sheet metal workers and riveters, not so ordinarily present.

It is yet a further object to provide a solar transparent roof cover which can be easily and inexpensively installed by the same tradesmen constructing the entire structure, which roof cover is easily replaceable.

It is an alternative object to provide a water and air-tight solar transparent roof cover which can be installed, maintained and replaced in sections or panels, from some convenient position under the rafters within the building, thus eliminating the need to ascend especially high steep roofs from the outside of the building, or resorting to such specialized equipment like a cherry picker or a backhoe.

These objects and others are provided by the new solar roof assemblage which consists of a multiplicity of parallel evenly spaced rafters which define a series of bays bounded on the sides by any two adjacent rafters, on the bottom by material which has a heat absorbing capacity and structural strength, such as sheet metal suitably darkened, fastened in a continuous manner across the bottom surfaces of several of the rafters, and on the top by solar transparent roof covers attached directly to the tops of the rafters.

Each rafter (except the one at each end of the roof) is provided with passageway at or near its end, alternately high and low on adjacent rafters, so that the bays collectively define a continuous channel throughout the entire solar roof assemblage, providing passageway for the cold air entering the solar roof assemblage at a return duct, and leaving the assemblage at a supply duct. It is envisioned that air will be forced through this active solar collecting assemblage under mechanical power. However, the design and operation of the overall system outside the solar roof assemblage is not a portion of this invention, and is left to those skilled in the principles of heat transfer and storage.

These objects and other objects and advantages will appear as the following detailed description ensues, aided by the accompanying drawings, in which.

DETAILED DESCRIPTION OF THE INVENTION

Figure 1:
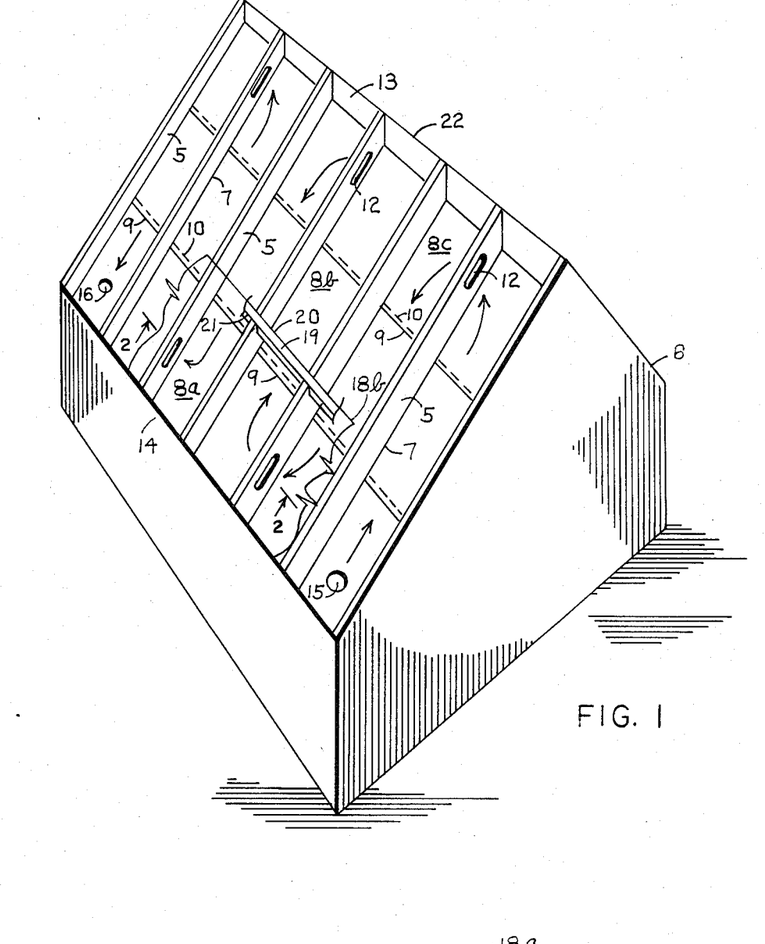
FIG. 1 is a perspective view of a building in which has been incorporated the solar roof assemblage.

Referring to FIG. 1, the solar roof assemblage utilizes a multiplicity of parallel main supporting members, or rafters 5, which constitute the support for the conventional roof for the building 6 and the solar collecting apparatus incorporated therein. The rafters could be of the usual wood (as shown), suitably fireproofed by spray, foam, rigid insulation, or other suitable means, or of any other appropriate material. Aluminum would be ideal, as the sides of aluminum rafters could be suitably darkened to provide an additional oblique solar collecting area.

Across the bottom surfaces 7 of the rafters 5, in a basically perpendicular direction thereto, and in a continuous unbroken manner, is fastened an appropriate heat absorptive surface 8, being comprised of generally long sheets of conductive material such as aluminum or copper. The sheets are installed across a plurality of rafters, in a manner similar to the way in which plywood sheathing would be attached across the tops of same in a conventional roof. Ideally, the metal sheets could be as long as the roof itself (except in very long roofs where the alternative roof cover, the internally removeable one, is used).

FIG. 1 depicts three sheets of metal, 8a, 8b and 8c, which comprise the entire heat absorptive surface 8, fastened across the bottom surfaces 7 of seven rafters 5 in such a manner that the bottom edge 9 of any given sheet (above the lowest sheet) slightly overlaps the top edge 10 of the adjacent sheet lower down the rafter. This installation provides a water-tight flashing effect to the building 6 which effectively provides hydraulic integrity to same in the event of breakage, damage or failure of the solar transparent roof cover.

Fastened across the bottom of the solar absorptive surface 8, and preferably installed by attaching directly to each rafter bottom 7, is suitable insulation 11, such as rigid board-like insulation. This serves the dual function of insulating the collector cavity, the air between the rafters, from the remainder of the building 6, and also providing structural support for the roof by acting in concert with the heat absorptive surface 8.

The insulation 11 is applied, as is the sheets of conductive material, across a plurality of rafters, so that both act together in providing enough structural support for the roof as to obviate the need for plywood sheathing, required by local building codes.

The rafters 5 (except the one at each end of the roof) are provided with passageways 12 at alternate ends, high and low on adjacent rafters, so that collectively the rafters 5 so opened, the heat absorptive surface 8, the solar transparent roof cover 17 discussed below, and the ridge board 13 and eave blocking 14 define a continuous air flow channel across virtually the entire heat absorptive surface 8. The passageways through the rafters could be provided at any point along any rafter to define any given path, but the preferred embodiment entails the high and low alternate as described above to utilize the entire heat absorptive surface 8.

In this embodiment air is made to enter the solar roof assemblage under mechanical power at the return duct 15, from which it passes through each and every bay as defined by the rafters 5, as it is warmed by heat which has passed through the solar transparent roof cover 17 and has been absorbed by the heat absorptive surface 8. Following the arrows as depicted in FIG. 1, it ultimately exits the solar roof assemblage at the supply duct 16, where it is either used immediately or sent to a storage medium.

The passageways 12 through the rafters 5 should be of sufficient area as to effectively pass the solar heated air from one bay to another without undue hydraulic impedance. The size of these passageways is a function of the size of the bay, the depth of and centerline distance between rafters.

Likewise, very large roofs with deep rafters might necessarily entail the use of multiple return ducts 15 and supply ducts 16, suitably positioned within the solar roof assemblage, to handle the movement of larger volumes of hot air utilizing given mechanical systems.

Figure 2:
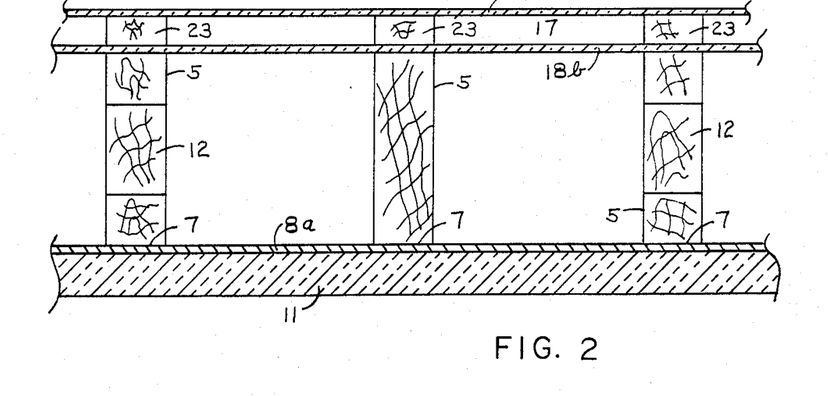
FIG. 2 is a fragmentary sectional view of the roof structure of the building illustrated in FIG. 1, and taken along the line 2—2 thereof, and illustrating the construction of the solar roof assemblage.

Referring now to FIG. 2, the transparent solar roof cover 17 is shown to consist of two individual layers of solar transparent material, an outer layer 18a and an inner layer 18b (greatly exaggerated in thickness for purpose of clarity). An example of a suitable material which could be used for such is a product called "Tedlar", manufactured by Du Pont Co. It is advertised as very easily fastened to wooden or metal surfaces by proper adhesives. It is also commercially available in rolls of substantially large width, thus resulting in very few, if any, joints.

It is envisioned that the first layer of solar transparent material, the inner layer 18b, would be comprised of a wide sheet at least as long as the distance between the outside corners of the two end rafters, easily applied by stretching out across the building and glued down to the top surfaces of the rafters 5. Epoxies and RTV silicones are suitable for use with one type of "Tedlar" film. The sheets are installed perpendicularly to the rafters 5. If the said rafters are longer than the width of the roll of transparent material, the inner layer 18b is installed from the bottom edge of a furring strip or other suitable rectangular cross section at the bottom of the roof structure, the top face of which is coplanar with the top surface of the rafters, to a similar furring strip 19 attached to the rafters such that its top face is likewise co-planar with the top face of the rafters, at some point such that its highest edge 20 is positioned to receive the end of the lowest sheet comprising the inner layer 18b. In similar manner the next higher sheet comprising the inner layer 18b will be made to extend from the lowest edge 21 of the furring strip 19 to the highest edge of a similar member higher up the rafter (not shown) until the ridge 22 is reached.

In the foregoing manner, the inner layer 18b is naturally flashed in a manner similar to the way in which the heat absorptive surface 8 was flashed. In the area over the top surfaces of members 19, the lower sheet is glued directly to member 19, while the overlapping next higher sheet is glued to the top end of the said lower sheet.

In a similar manner, an outer layer of solar transparent material 18a is attached to a frame which is disposed between the inner and outer layers. (Only a portion of the inner layer 18b is shown in FIG. 1). The frame, conveniently comprised of wooden members 23 (shown in FIG. 2) extends longitudinally along the tops of the rafters 5 and the furring strips 19, including the top edges of the ridge 22 and eave blocking 14. The wooden members 23 are of a thickness between one-half inch to one inch, to provide a proper spacing between the outer layer 18a and the inner layer 18b of the solar transparent roof cover 17. The side edges of the members 23 are approximately co-planar with the rafters and firring strips over which they are fastened.

The method of affixing the said wooden frame comprised of members 23 can be by gluing to the top surface of the inner layer of solar transparent material 18b, or by nailing through same into the rafters 5, or both. A material such as "Tedlar" may be susceptible to tears if subjected to nailing. However, if it is first glued to the tops of the rafters 5, the glue will serve to retard such tendency. The pressure caused by the frame comprised of members 23 should also serve that end. The outer layer 18a is glued directly to the top of the frame comprised of members 23.

Suitable gasket material could alternatively be disposed between the tops of the rafters 5 and firring strips 19, and the inner layer 18b, in order to compensate for any unevenness in the plane as defined by the top surfaces of these members, or for any roughness which may tend to tear the solar transparent material.

Similarly, suitable gasket material could be further disposed between the wooden frame comprised of members 23, and the outer layer 18a. (Neither gasket material is shown in FIGS. 1 or 2).

INTERNALLY REMOVABLE SOLAR TRANSPARENT ROOF COVER

Figures 3, 4, 5:
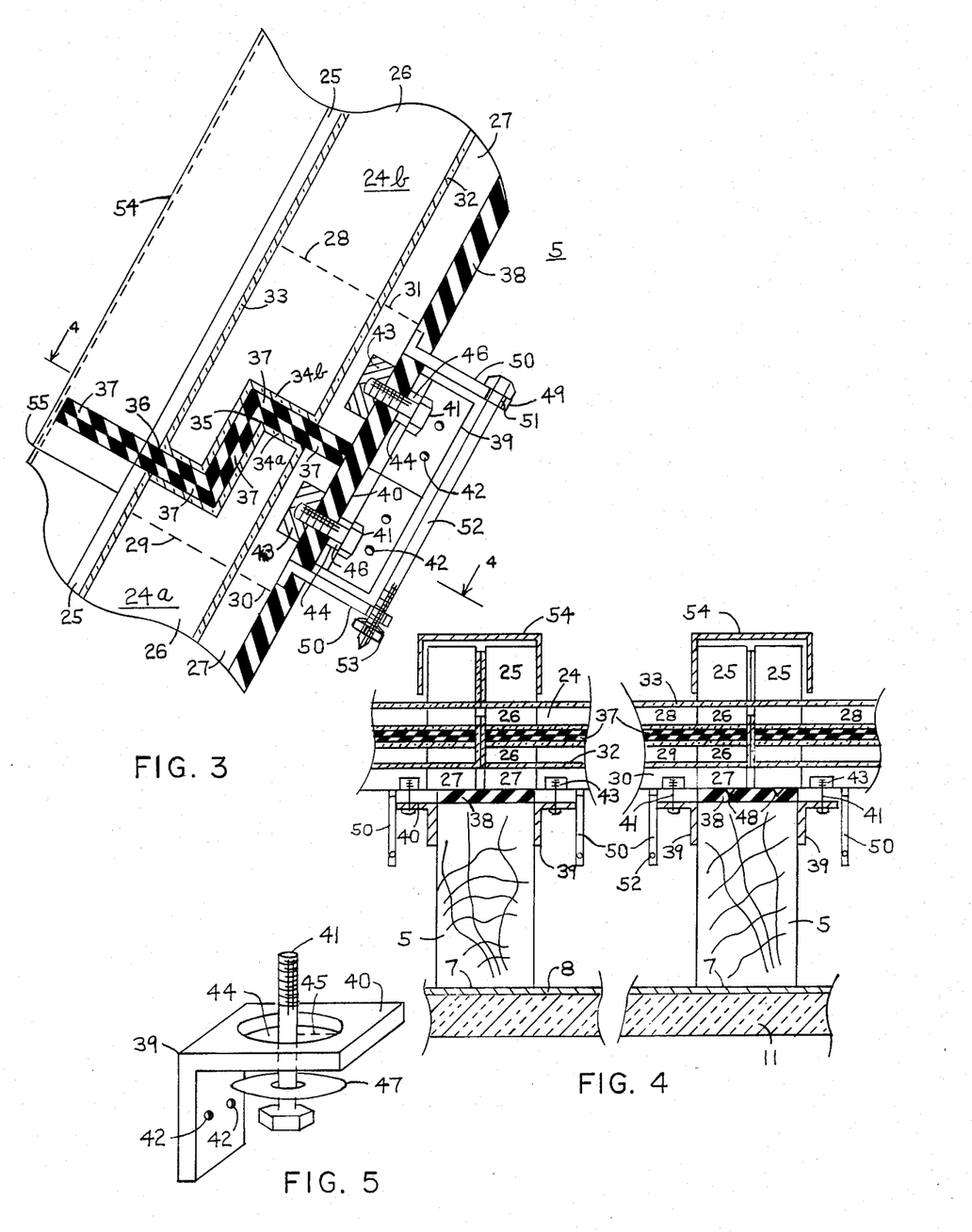
FIG. 3 is a fragmentary sectional view of the alternative embodiment of the invention, the internally removeable solar transparent roof cover, taken a short distance off the edge of a typical rafter, in the longitudinal direction thereof, and illustrating two vertically adjoining cover frames, a multiplicity of which cover frames comprise the solar transparent roof cover.
FIG. 4 is a fragmentary sectional view taken along the line 4—4 of FIG. 3, illustrating the attachment of a typical removeable cover frame to two adjacent rafters, and its relation to two similar cover frames which span the bays immediately adjacent to the left and right.
FIG. 5 is an enlarged view of a fastening device used to attach the removeable transparent cover frames to the rafters.

FIGS. 3 and 4 illustrate the vertical interlocking and horizontal abutting and flashing of typical solar transparent roof cover frames 24, which collectively comprise a solar transparent roof cover. Said cover frames are installed or removed from the solar roof assemblage from some point under the rafters 5 within the building 6.

The solar transparent cover frames 24 are initially installed on top of the rafter gaskets 38 as described in the following paragraphs. However, if a portion of the solar transparent roof cover needs servicing or replacement after the collector has been constructed, both the rigid board-type insulation 11 and sheets comprising the heat absorptive surface 8 are removed from the bottom surfaces 7 of the rafters 5 through the disengagement of suitable detachable fasteners (not shown), such as screws or bolts, or double headed nails like the type used in the temporary construction of concrete forms. Sufficient insulation 11 and sheets comprising the absorptive surface 8, installed in sections of convenient size, must be removed to allow basically complete exposure of that cover frame 24 needing service or replacement. For this reason it may be convenient to limit the lengths of the sheets of absorptive surface 8 to spanning six or seven rafters.

The individual cover frames 24 are composed of generally long longitudinal members 25, 26, and 27, and transverse members 28, 29, 30, and 31 which are approximately equal to a length such that when fastened perpendicularly to the longitudinal members 25, 26 and 27, the resulting cover frame 24 is equal in width, or a little less than, the centerline distance between rafters.

The cover frame 24 is assembled in such a manner as to serve as a frame or housing for one or more layers of suitable solar transparent material. In the present embodiment of the invention, two layers of suitable pliable solar transparent material are shown to be supported by the cover frames 24, an inner cover 32, and an outer cover 33. Each cover frame has two each rectangular longitudinal members 25, two each rectangular members 26 notched at each end as shown in FIG. 3, two each rectangular members 27, a transverse member 28 (L-shaped) extending between notched longitudinal members 26 at the lower end of the cover frame 24, a transverse L-shaped member 29 extending between notched longitudinal members 26 at the top end of the cover frame 24, and rectangular transverse members 30 and 31 extending between the two longitudinal members 27 at the top and bottom ends of the cover frame 24, respectively. In this manner it can be seen that the solar transparent material constituting the outer cover 33 and inner cover 32 can be bonded to the frame, beginning at some arbitrary point on the middle of the top of a transverse member such as member 28, simultaneously on the top of the lower ends of longitudinal members 26, then around the bottoms of the notched ends of members 26 and four additional surfaces of transverse member 28 simultaneously, up the bottom edges of members 26 disposed between those members and longitudinal members 27, around the tops of the notches of members 26 and simultaneously around five surfaces of transverse member 29, finally down the top surfaces of longitudinal members 26 to the point of beginning.

A single material such as 4 mil "Tedlar" can be used for both the outer cover 33 and the inner cover 32. In such case, the foregoing method of construction of both inner and outer covers can be accomplished with a single piece of material. Different materials could be used for each of the two covers, however, in which event it would be convenient to terminate and perhaps slightly overlap the two materials at a point around 34a on the upper end of the frame, and 34b on the lower end of the frame.

The solar transparent material comprising the inner cover 32 and the outer cover 33 (exaggerated many times in thickness for purpose of clarity) is shown to bend at right angles at the side edges of the cover frames 24 and then extend generally upward along the outside faces of longitudinal members 25 and 26, to provide additional insurance against leaks. This can be accomplished by appropriately notching out the excess of the sheet of material in the area where it extends around both ends of the cover frame 24.

Nevertheless, the entire cover frame 24 is assembled so as to house the inner and outer covers utilizing suitable gasket or caulking materials (not shown) so as to effectively seal the unit from the infiltration of water, and the escape of air and heat.

It will be appreciated from the foregoing that the individual cover frames 24 can be constructed with longitudinal members 26 notched and transverse members 28 and 29 dimensioned in such a manner that for any given roof slope, the material of the outer cover 33 of any given cover frame 24a can be made to extend to some point 35 higher than the lowest exposed point 36 of the outer cover 33 of the higher adjoining cover frame 24b. This effectively assures a gravity flashing between vertically adjoining cover frames 24.

It will be further appreciated that the ends of the individual cover frames 24 can be suitably beveled rather than notched, to attain a similar interlocking and flashing effect.

The discussion up to this point has concerned itself with the two ends of typical cover frames 24 which interlock with each other in the vertically adjacent direction. It will be appreciated that the lower end of the lowest cover frame 24, and the higher end of the highest cover frame 24 in any given bay will have to be constructed slightly differently, depending upon the slope of the roof, so as to seal the collector cavity by interlocking with the eave blocking 14 and the ridge board 13, respectively.

Suitable heat and water resistant gasket material 37 is integrally attached to all end surfaces of the cover frames 24 which will abut end surfaces of vertically adjacent cover frames 24 when both are in place.

FIG. 3 illustrates the upper end of a typical cover frame 24a joining the lower end of a similar cover frame 24b. Along the entire top surface of rafter 5 is integrally fastened a suitable heat and water resistant gasket material, rafter gasket 38. The solar industry has developed high strength EPDM elastometric materials as well as special silicone elastometric materials especially for this purpose. The individual cover frames 24 are installed on top of rafter gasket 38 through pressure developed by the action of bolt 41 extending through L-shaped fastening bracket 39, and engaging the threaded receptacle 43 set in or on both ends of transverse members 30 and 31 of the cover frame 24.

Fastening bracket 39 is attached to the side of rafter 5 by screw, bolt or nail through holes 42 in its vertical leg such that the top surface 40 of its horizontal leg is approximately coplanar with the top surface of the rafter 5.

The hole 44 in the horizontal leg of fastening bracket 39 is of a shape and sufficiently large size as to provide the bolt 41 with leeway 45 in the direction perpendicular to the rafter 5 in order to allow for variances and imperfections in the rafters themselves or their incorporation into building 6. Similarly, leeway 46, in a direction parallel to the rafters, is provided between bolt 41 and fastening bracket 39 in order to allow for lack of true alignment, wear in gasket material 37, etc. Either the head of bolt 41 or washer 47 of sufficiently large size is made to bear upon the bottom surface of the horizontal leg of fastening bracket 39 when the opposite end of bolt 41 engages the threaded receptacle 43 in cover frame 24.

Fastening brackets 39 are required at either end of the cover frame 24, on both rafters 5 to which it is fastened. Depending on the material of the cover frame, the length of same, and other variables, additional fastening brackets 39 may be required at intermediate locations along the cover frame 24 (and hence additional transverse members co-planar to members 30 and 31, and additional threaded receptacles 43 in or on the said members) in order to develop sufficient bearing pressure between the cover frame 24 and rafter gasket 38. Additional transverse members may be required to strengthen especially long cover frames in any case.

Additional gasket material 37 (not shown) is integrally affixed to the bottom surfaces of the cover frames 24 which bear on rafter gasket 38, thus insuring a greater seal.

Similarly, a short tapered lip-like protrusion 48 (shown in FIG. 4) could be integrally sealed and incorporated into the bottom surfaces of longitudinal members 27 along their entire lengths, so as to achieve a greater pressure against rafter gasket 38, and hence a more effective seal.

It will be observed that the distance between the holes of the threaded receptacles 43 in vertically adjoining cover frames 24 is generally constant, except for imperfect alignments and wear of gasket 37, which are compensated for by leeway 46. It will therefore be appreciated that the two fastening brackets 39 shown in FIG. 3 could be produced as a single bracket with the two holes 44 spaced appropriately.

Referring again to FIG. 3. A typical cover frame 24a is secured to the top of rafter gasket 38 by the action of four bolts 41 and fastening brackets 39 which engage the corresponding threaded receptacles 43 at each end of transverse members 30 and 31. Cover frame 24b is similarly secured to the rafter gasket 38 by four identical bolts 41. As two bolts 41 engage the two threaded receptacles 43 in transverse member 31 of cover frame 24b, the said cover frame is caused to press against rafter gasket 38. Simultaneously, the gasket material 37 integrally affixed to the bottom surface of its transverse member 28 as well as to the bottom surfaces of the notches of its longitudinal members 26, is caused to press against gasket material 37 also integrally affixed to the top surface of transverse member 29 as well as to the top surfaces of the notches of members 26, all of the vertically adjacent cover frame 24a.

A tight pressurized fit is obtained between the two cover frames 24 in the direction parallel to the rafters, or along the other two faces of abutting gasket material 37, by the longitudinal tightening device 49.

Two metal brackets 50 are integrally attached to each end of a cover frame 24, one at each end of their respective transverse members 30 and 31, in close proximity to each adjoining rafter 5. A hole 51 is provided through the end (or near the end) of each bracket, and a bolt 52 extends through holes 51 of brackets 50 in vertically adjacent cover frames, of such suitable length as to engage nut and lock washer 53. The vertically adjacent cover frames 24 are thereby caused to press against each other in the area of their respective gasket material 37, in a direction parallel to the rafters.

It is pointed out that holes 51 are made somewhat larger than the diameter of bolts 52 to allow for lack of perfect alignment of the brackets 50 in vertically adjacent cover frames 24.

It will be observed that nut and lock washer 53 could be replaced by providing a threaded receptacle in the hole 51 of either adjacent metal bracket 50.

It will now be appreciated that a higher cover frame 24b can be installed against a lower one (24a) by first abutting the higher against the lower (already firmly installed) by manual force in the direction of the slope of the rafters, then slightly handtightening the four bolts 41, then tightening the two bolts 52 and the four bolts 41, alternately and gradually, in such a manner that a suitably tight fit is achieved both between cover frame 24b and rafter gasket 38, and the gasket materials 37 of the vertically adjoining cover frames 24.

FIG. 4 further illustrates the means employed for flashing the areas over the centerlines of rafters upon which typical cover frames 24 adjoin horizontally. The compression of gasket material 37 and rafter gasket 38 as explained above would serve to prevent entry of water into the air passageway between the rafters 5, by channeling the flow along the top of rafter gasket 38 atop rafter 5, and out the lowest end of the roof.

However, further protection is afforded by attaching inverted U-shaped flashings 54 to the inside faces of longitudinal members 25 of all cover frames 24 in alternate bays. The cross section is of sufficient dimensions as to cover the adjoining longitudinal members 25 of horizontally adjacent cover frames 24. The cover frames 24 over these adjoining bays are not so provided with flashing.

Flashing 54 extends along the entire length of longitudinal members 25, from approximately the highest end to a short distance 55 beyond the lowest end. In such manner, a higher flashing 54 is made to overlap a lower one. Additionally, to accomplish such purpose, the distance between the two vertical legs of flashing 54 and the height of its horizontal surface above the top surface of longitudinal member 25 must be made progressively a little larger in each higher vertically adjacent cover frame 24.

Although the vertical legs of flashing 54 attached to longitudinal members 25 appear to be flush with same in FIG. 4, suitable clearance between the two is actually provided in the lower several inches, in order for the higher end of a lower cover frame 24 to be fitted up under the flashing 54 of the higher cover frame 24.

From the foregoing disclosure it will be seen that any given cover frame 24 spanning a bay over which the individual cover frames have been provided with inverted U-shaped flashings 54, such as the middle bay of FIG. 4, can be directly removed by the disengagement of bolts 41 and bolts 52. Cover frames over alternate bays, however, pinned down by the overlapping flashings 54 of the two horizontally adjacent cover frames 24, cannot be so removed until the removal of the said two horizontally adjacent cover frames 24.

From the foregoing disclosure it can be seen that a solar transparent roof cover can be provided for the solar roof assemblage consisting of a multiplicity of cover frames which individually seal against the rafter gasket and against each other in the direction along the rafters, thus resulting in a water and airtight seal between the cavity of the collector and the outside atmosphere.

The embodiments of the invention in which an exclusive property or privilege is claimed are as follows:

1. An integrated roof structure for a building, the roof structure being capable of collecting solar energy for use in the building, said roof structure comprising:
    a plurality of rafters extending generally parallel to one another and spaced laterally from one another, said rafters each having a top surface and an opposite bottom surface;
    an outer roof cover juxtaposed with the top surfaces of the rafters and laterally spanning said plurality of rafters, the outer roof cover including solar energy transparent portions located between adjacent rafters;
    an inner roof cover including a structurally reinforcing sheet comprising solar energy absorptive material, such as metal, said sheet being juxtaposed with the bottom surfaces of the rafters and laterally spanning said plurality of rafters, to provide structural reinforcement and solar energy absorptive surfaces between said adjacent rafters;
    first securing means securing the inner roof cover to the bottom surfaces of the rafters for establishing a laterally reinforced integrated rafter and inner roof cover structure;
    second securing means securing the outer roof cover to the top surfaces of the rafters, with the solar energy transparent portions confronting the solar energy absorptive surfaces of the inner roof cover, to establish solar energy collecting bays bounded by adjacent rafters and the upper and lower roof covers; and
    passage means associated with the solar energy collecting bays to enable the flow of an energy transfer fluid between the bays, and the attendant transfer of solar energy collected in each bay.

2. The invention of claim 1 wherein the passage means includes passageways passing through said rafters to interconnect said bays.

3. The invention of claim 1 wherein the outer roof cover includes a sheet of solar energy transparent material extending generally perpendicular to said rafters.

4. The invention of claim 1 wherein the inner roof cover includes a sheet of solar energy absorptive material extending generally perpendicular to said rafters.

5. The invention of claim 1 including further surfaces on the inner roof cover opposite the solar energy absorptive surfaces, and a layer of solar energy insulation material contiguous with said further surfaces.

6. The invention of claim 1 wherein the outer roof cover includes a plurality of layers of solar energy transparent material.

7. The invention of claim 1 wherein the outer roof cover includes a first sheet of solar energy transparent material extending generally perpendicular to said rafters, a second sheet of solar energy transparent material generally coextensive with the first sheet and spaced therefrom, and spacer means between the first and second sheets and generally coextensive with the top surfaces of the rafters, said second securing means securing the first and second sheets and the spacers in place upon the top surfaces of the rafters.

8. The invention of claim 1 wherein the roof structure is sloped, with the rafters extending between a lower elevation and a high elevation, the outer roof cover including a plurality of sheets of solar energy transparent material, each sheet laterally spanning said plurality of rafters at different elevations and having a lower laterally-extending edge portion and an upper laterally-extending edge portion, the lower edge portion of each higher one of adjacent sheets overlapping the higher edge portion of the lower one of said adjacent sheets.

9. The invention of claim 1 wherein the outer roof cover includes a plurality of cover frames, each cover frame extending laterally between at least two adjacent rafters and terminating adjacent the centerlines of said two rafters, said second securing means operatively associated with each cover frame and the corresponding rafters so as to be selectively detachable from beneath the cover frames, thereby enabling selective removal of each cover frame from the corresponding rafters from within the roof structure.

10. The invention of claim 9 wherein each of said cover frames includes an outer layer of a solar energy transparent material, an inner layer of a solar energy transparent material, and support means for supporting said outer and inner layers spaced from one another and spanning the top surfaces of said rafters.

11. The invention of claim 9 wherein the roof structure is sloped, with the rafters extending between a lower elevation and a higher elevation, and the outer roof cover includes a plurality of said cover frames, each cover frame having a lower laterally-extending edge portion and an upper laterally-extending edge portion, the cover frames being arranged longitudinally along corresponding adjacent spanned rafters between lower and higher elevations such that the lower edge portion of a higher one of two adjacent cover frames overlaps and interfits with the higher edge portion of the lower one of said two adjacent cover frames.

12. The invention of claim 9 including a layer of solar energy insulation material beneath the reinforcing sheet and contiguous therewith, and further securing means securing the layer of solar energy insulation material to the bottom surfaces of the rafters.

13. The invention of claim 1 wherein the roof structure is sloped, with the rafters extending between a lower elevation and a higher elevation, the inner roof cover including a plurality of reinforcing sheets, each sheet laterally spanning said plurality of rafters at different elevations and having a lower laterally-extending edge portion and an upper laterally-extending edge portion, the lower edge portion of each higher one of adjacent sheets overlapping the higher edge portion of the lower one of said adjacent sheets.

* * * * *

UNITED STATES PATENT AND TRADEMARK OFFICE
CERTIFICATE OF CORRECTION

PATENT NO. : 4,526,161

DATED : July 2, 1985

INVENTOR(S) : Francis A. Kaicher

It is certified that error appears in the above-identified patent and that said Letters Patent is hereby corrected as shown below:

The title page should be deleted to appear as per attached title page.

The sheets of drawings containing figures 1-5 should be deleted to be replaced with figures 1-5 as shown on the attached sheets.

Signed and Sealed this

Fifteenth Day of October 1985

[SEAL]

Attest:

Attesting Officer

DONALD J. QUIGG

Commissioner of Patents and Trademarks—Designate

United States Patent [19]

Kaicher

[11] Patent Number: 4,526,161
[45] Date of Patent: Jul. 2, 1985

[54] SOLAR ROOF ASSEMBLAGE AND INTERNALLY REMOVABLE SOLAR TRANSPARENT ROOF COVER

[76] Inventor: Francis A. Kaicher, P.O. Box 643, Highland Lakes, N.J. 07422

[21] Appl. No.: 597,174

[22] Filed: Apr. 5, 1984

Related U.S. Application Data

[63] Continuation of Ser. No. 246,742, Mar. 23, 1981, abandoned.

[51] Int. Cl.³ .............................................. F24J 3/02
[52] U.S. Cl. .................................. 126/444; 126/429; 126/450
[58] Field of Search ................ 126/428, 429, 444, 450

[56] References Cited

U.S. PATENT DOCUMENTS

| | | | |
|---|---|---|---|
| 4,062,346 | 12/1977 | Rapp, Jr. et al. | 126/429 |
| 4,098,260 | 7/1978 | Goettl | 126/429 |
| 4,111,359 | 9/1978 | Trombe et al. | 126/429 |
| 4,150,660 | 4/1979 | Peters et al. | 126/429 |

Primary Examiner—Larry Jones
Attorney, Agent, or Firm—Samuelson & Jacob

[57] ABSTRACT

An integrated roof structure for a building is capable of collecting solar energy for use in the building and includes a plurality of parallel rafters, an outer roof cover secured to the tops of the rafters and having solar energy transparent portions between the rafters, and an inner roof cover secured to the bottoms of the rafters and having structurally reinforcing portions spanning the rafters and solar energy absorptive surfaces between the rafters and confronting the solar energy transparent portions to establish solar energy collecting bays bounded by adjacent rafters and the upper and lower roof covers.

13 Claims, 5 Drawing Figures